3,159,641
PROCESS FOR SEPARATING 4:4' BIPYRIDYL
FROM MIXTURES
Ralph Santorre Fanshawe, Widnes, and Charles Shepherd, Bracknell, England, assignors to Imperial Chemical Industries Limited, London, England, a corporation of Great Britain
No Drawing. Filed Feb. 25, 1963, Ser. No. 260,882
Claims priority, application Great Britain Feb. 27, 1962
17 Claims. (Cl. 260—296)

This invention relates to a process for separating 4:4'-bipyridyl from mixtures containing it, and particularly from mixtures of bases produced in processes for making bipyridyls from pyridine.

4:4'-bipyridyl is a useful intermediate for the manufacture of herbicidal materials, but corresponding products derived from the various isomeric bipyridyls may differ considerably in their herbicidal activity. Most of the methods at present available for producing bipyridyls give rise to mixtures of isomers, often in admixture with higher polypyridyls, polymeric organic bases and tars. In particular, the 4:4'-bipyridyl produced by oxidation of a sodium-pyridine interaction product contains an appreciable proportion of 2:4'-bipyridyl. As it is commercially desirable to produce herbicidal products in a form having a high concentration of active agent and a standard activity, some inexpensive method for purifying 4:4'-bipyridyl is needed. The separation of 4:4'-bipyridyl from such mixtures by conventional means is not at all easy, especially when the process is carried out on a large scale, because of the similar physical properties of the isomers. The boiling points of 2:4' and 4:4'-bipyridyls are both close to 300° C., for example, and attempts to separate them by fractional distillation are hindered by the tendency of the isomers to co-distil.

We have now found that 4:4'-bipyridyl can be separated very easily and simply from mixtures containing it, and particularly from admixture with its isomers and other bases, as its hydrate. This hydrate of 4:4'-bipyridyl is substantially a dihydrate, and is relatively insoluble in water.

Thus according to the present invention we provide an improved process for the separation of 4:4'-bipyridyl from a mixture containing it, which comprises treating the said mixture with water under conditions which result in the formation of 4:4'-bipyridyl hydrate and thereafter separating the said hydrate.

The process of our invention is especially applicable to the separation of 4:4'-bipyridyl from associated 2:4'-bipyridyl and 2:2'-bipyridyl, and can be used to separate 4:4'-bipyridyl in substantially pure form. Mixtures containing 4:4'-bipyridyl which are particularly suitable for treatment by the process of the present invention include those mixtures of bases, predominantly bipyridyls, produced from metal-pyridine interaction products, for example by oxidation. The mixtures of bases produced from sodium-pyridine interaction products in particular tend to contain much of the 2:2'-isomers in addition to the 4:4'-isomers, and are especially advantageously treated by the present process. The crude products or mixtures of bases produced from magnesium-pyridine and aluminum-pyridine interaction products tend to contain a much higher content of the 4:4'-isomer, but even so our process offers a very simple and rapid method for isolating and purifying the product.

The mixture containing 4:4'-bipyridyl may be treated directly with water at a temperature below the decomposition temperature of the hydrate (i.e. below approximately 60° C.). To minimise the inclusion of impurities within the solid hydrate, however, it is preferred that the mixture containing 4:4'-bipyridyl is treated with water at a temperature above the decomposition temperature of the hydrate (i.e. above approximately 60° C.) and preferably above about 80° C. and that the treated mixture is then brought to a lower temperature at which the hydrate forms and separates from the mixture.

Preferably, the mixture containing 4:4'-bipyridyl is dissolved in water at a temperature above 60° C., and preferably above 80° C., and the resulting solution is then cooled to a temperature below 60° C., and preferably below 30° C. to make the hydrate crystallise out. If any undissolved matter remains when the bipyridyls have been dissolved at the higher temperature, this may be removed before the solution is cooled.

The conversion of the 4:4'-bipyridyl into its hydrate can be achieved very conveniently using steam, for example by passing steam through an aqueous solution or suspension of the bipyridyl mixture. The bipyridyl mixtures dissolve in water at temperatures above about 80° C., and the dissolution can conveniently be achieved by passing steam through an aqueous slurry of the bipyridyl mixture until the bipyridyls dissolve.

The proportion of water to be used in the treatment is preferably enough to provide a reasonably fluid composition without introducing so much water that either precipitation of the 4:4'-bipyridyl hydrate is made difficult due to it being present in too dilute a concentration, or filtration of the resulting aqueous liquor is rendered unduly tedious because of the volume of liquor to be handled. Thus, the amount of water used is preferably between 1 and 10 times the weight of the bipyridyl mixture. When using steam as the source of heat, allowance should be made for the water introduced into the mixture by condensation of the steam.

Since the hydrate of 4:4'-bipyridyl is less soluble in cold water than in hot water, it is advisable to allow the hot aqueous mixture to cool sufficiently for the hydrate to crystallise and to be separated from the mixture. Moreover, since the 2:4'-isomer is more soluble in cold water than in hot water, cooling of the treated mixture involves little risk of the 2:4'-isomer separating out. The exact temperature to which the treated mixture is cooled does not appear to be very critical, but is preferably below 30° C. In practice it has been found very convenient to cool the treated mixture to room temperature or below before separating the 4:4'-bipyridyl hydrate. Formation of the hydrate is usually rapid, but it is usually desirable to allow the mixture to stand until crystallisation is complete.

Alternatively, the mixture of bases may be dissolved in an organic solvent and sufficient water may be added to precipitate the 4:4'-bipyridyl as hydrate. A solvent in which the hydrate is sparingly soluble is preferred, and particularly an organic solvent which is substantially immiscible with water, for example a halogenated hydrocarbon such as trichloroethylene, carbon tetrachloride, or tetrachloroethylene, or a hydrocarbon solvent such as toluene, benzene or a petroleum fraction. Mixtures of solvents may be used if desired. The treatment with water is preferably carried out at a temperature below about 30° C. Any materials insoluble in the organic solvent may be removed by filtration before the water treatment.

The hydrate may be separated from the liquid phases in any of the processes described above by conventional techniques, for example by filtration, centrifuging, decantation, or combinations of such techniques. The solid hydrate may then be washed, particularly with cold water, to remove adhering liquid and any impurities therein.

The hydrate of 4:4'-bipyridyl may be used or stored as such, or may be converted into the anhydrous 4:4'-bipyridyl in known manner, for example by heating to above 60° C. for sufficient time to drive off the water of hydration. If the hydrate is heated under reduced pressure, drying can take place at a lower temperature. The anhydrous material may be distilled or recrystallised if desired.

The 4:4′-bipyridyl may be used for the manufacture of herbicidal materials, for example by quaternisation with methyl sulphate, methyl chloride or other quaternising agents.

The invention is illustrated but not limited by the following examples in which the parts and percentages are by weight.

*Example 1*

Steam at atmospheric pressure was bubbled into a slurry of 200 parts of a crude bipyridyl mixture in 200 parts of cold water until all the bipyridyl mixture had dissolved, and then for a further 10 minutes. The passage of steam was then discontinued and the resulting solution was cooled to a temperature between 5° and 10° C. The precipitate of solid hydrate of 4:4′-bipyridyl which separated from the cooled solution was collected by filtration and air-dried. The yield of product was 150 parts, which corresponded to a recovery (calculated as the dihydrate) of 95%.

The crude bipyridyl mixture used in the procedure of this example was made by oxidation of a sodium-pyridine interaction product and contained 64.7% of 4:4′-bipyridyl, 31.6% of 2:4′-bipyridyl and 3.7% of minor impurities (mainly pyridine and polymers of organic bases obtained as impurities in the preparation of the crude bipyridyl mixture from pyridine).

*Example 2*

The procedure of Example 1 was repeated using 2000 parts of water and 500 parts of a crude bipyridyl mixture containing 70.8% of 4:4′-bipyridyl, 21.5% of 2:4′-bipyridyl and 7.7% of minor impurities (similar to those present in the bipyridyl mixture used in Example 1).

The yield of 4:4′-bipyridyl hydrate was 454 parts, corresponding to a substantially theoretical recovery, calculated as the dihydrate.

*Example 3*

500 parts of a solution in trichloroethylene of the crude mixed bipyridyls obtained by oxidation of a magnesium-pyridine interaction product, and containing approximately 58.8 parts of 4:4′-bipyridyl, was mixed at 20° C. with 150 parts of water. The crystalline precipitate which formed was collected by filtration, and was found by analysis to contain 47 parts of 4:4′-bipyridyl in the form of its hydrate, representing a recovery of 80%.

What we claim is:

1. Process for the separation of 4:4′-bipyridyl from a mixture containing said 4:4′-bipyridyl and isomeric bipyridyls, which comprises treating the said mixture with water under conditions which result in the formation of 4:4′-bipyridyl hydrate and thereafter separating the hydrate.

2. A process for the separation of 4:4′-bipyridyl from a reaction mixture containing 4:4′-bipyridyl and isomeric bipyridyls, which comprises treating the reaction mixture with sufficient water to form a 4:4′-bipyridyl hydrate precipitate from the 4:4′-bipyridyl, and thereafter separating the 4:4′-bipyridyl hydrate from the resulting mixture.

3. Process as claimed in claim 1 wherein the mixture from which the 4:4′-bipyridyl is separated is the mixture of bipyridyls produced from a metal-pyridine interaction product, by oxidation of the metal-pyridine interaction product.

4. Process as claimed in claim 3, wherein there is used a mixture of bipyridyls derived from a sodium-pyridine interaction product.

5. Process as claimed in claim 3 wherein there is used a product derived from a magnesium-pyridine interaction product.

6. The process of claim 3 wherein there is used a product derived from an aluminum-pyridine interaction product.

7. Process as claimed in claim 1 wherein the mixture containing 4:4′-bipyridyl is treated with water at a temperature below 60° C.

8. Process as claimed in claim 1 wherein the mixture containing 4:4′-bipyridyl is treated with water at a temperature above 60° C., and the treated mixture is then cooled to a temperature below 60° C.

9. Process as claimed in claim 8 wherein the mixture containing the 4:4′-bipyridyl is dissolved in water at the temperature above 60° C. and the resulting solution is cooled to the temperature below 60° C.

10. The process of claim 8 wherein the mixture is treated with water at a temperature above 80° C.

11. The process of claim 8 wherein the mixture is cooled to a temperature below 30° C.

12. Process as claimed in claim 1 wherein the amount of water used is between 1 and 10 times the weight of the bipyridyl mixture.

13. Process as claimed in claim 1 wherein the mixture containing 4:4′-bipyridyl is dissolved in an organic solvent and sufficient water is added to precipitate the 4:4′-bipyridyl as hydrate.

14. Process as claimed in claim 13 wherein the organic solvent is a substantially water-immiscible solvent.

15. Process as claimed in claim 14 wherein the organic solvent is selected from the group consisting of a hydrocarbon and a chlorinated hydrocarbon.

16. In a process for the separation of 4:4′-bipyridyl from a reaction mixture containing 4:4′-bipyridyl and isomeric bipyridyls, wherein the reaction mixture is formed by interacting a compound selected from the group consisting of pyridine and alkyl derivatives thereof with a reactive metal to form a metal-pyridine interaction product, and the metal-pyridine interaction product is then oxidized to form the reaction mixture, the improvement which comprises treating the reaction mixture with water to form a precipitate of 4:4′-bipyridyl hydrate from the 4:4′-bipyridyl, and thereafter separating the 4:4′-bipyridyl hydrate from the reaction mixture.

17. Process as claimed in claim 1 wherein the 4:4′-bipyridyl hydrate is converted to 4:4′-bipyridyl.

References Cited in the file of this patent

Smith: JACS, vol. 46, pp. 414–19 (1924).
"Chemical Abstracts," vol. 42, p. 5912 (1948) abstracting Arbuzov "Bull. Acad. Sci. URSS Classe Sci. Chim." (1945), pp. 451–5.